United States Patent [19]
Jette et al.

[11] Patent Number: 5,517,956
[45] Date of Patent: May 21, 1996

[54] TITANIUM ENGINE VALVE

[75] Inventors: Paul M. Jette, Pasadena; Alfred W. Sommer, Calabasas, both of Calif.

[73] Assignee: Del West Engineering, Inc., Valencia, Calif.

[21] Appl. No.: 289,096

[22] Filed: Aug. 11, 1994

[51] Int. Cl.$^6$ ........................................................ F01L 3/02
[52] U.S. Cl. ................... 123/188.3; 29/888.45; 251/367; 251/368
[58] Field of Search ............... 123/188.3, 188.9; 29/888.45, 888.451, 888.452; 251/368, 367

[56] References Cited

U.S. PATENT DOCUMENTS

| | | | |
|---|---|---|---|
| 4,073,474 | 2/1978 | Hashimoto et al. | 251/368 |
| 4,201,162 | 5/1980 | Speckhart . | |
| 4,337,735 | 7/1982 | Lichtner et al. . | |
| 4,443,652 | 2/1984 | Holtzberg et al. . | |
| 4,675,964 | 6/1987 | Allison . | |
| 4,729,546 | 3/1988 | Allison | 251/368 |
| 4,834,036 | 5/1989 | Nishiyama et al. | 123/188.2 |
| 4,852,531 | 8/1989 | Abkowitz | 123/188.3 |
| 4,867,116 | 9/1989 | de Freitas Couto Rosa et al. . | |
| 4,902,359 | 2/1990 | Takeuchi et al. . | |
| 5,001,019 | 3/1991 | Ito et al. . | |
| 5,040,501 | 8/1991 | Lemelson | 123/188.3 |
| 5,112,415 | 5/1992 | Mae | 123/188.3 |
| 5,169,460 | 12/1992 | Mae . | |
| 5,370,364 | 12/1994 | Kenmoku et al. | 123/188.3 |
| 5,370,928 | 12/1994 | Shimizu et al. | 123/188.3 |

FOREIGN PATENT DOCUMENTS

| | | | |
|---|---|---|---|
| 2827271 | 1/1979 | Germany | 29/888.45 |
| 0634617 | 3/1950 | United Kingdom | 29/888.451 |

OTHER PUBLICATIONS

"Titanium in Engine Valve Systems", J. E. Allison et al., Journal of Metals, Mar. 1987.

*Primary Examiner*—Erick R. Solis
*Attorney, Agent, or Firm*—Blakely, Sokoloff, Taylor, Zafman

[57] ABSTRACT

A titanium engine valve is fabricated with discrete head and stem portions, preferably joined by inertia welding and/or diffusion bonding. The joint between the head and stem portions is located well up on the valve stem so that it is not exposed below the valve guide. The head portion, including a fillet region and lower stem region, is composed of a first material comprising titanium, such as a conventional high strength titanium alloy. Alternatively, the head portion may consist of a cast or forged heat treated TIC. The stem portion, which is not directly exposed to the hostile environment of the combustion chamber, is composed of a second material comprising titanium, such as mill annealed titanium alloy rod stock. The resulting valve is, therefore, much less expensive to manufacture than a conventional titanium valve without sacrificing any mechanical characteristics in the portions of the valve subjected to high stress and temperature.

15 Claims, 1 Drawing Sheet

5,517,956

TITANIUM ENGINE VALVE

BACKGROUND OF THE INVENTION

1. Field of the Invention

The present invention relates to titanium valves for internal combustion engines and, particularly, to a valve in which the head and stem portions of the valve may be individually fabricated, heat treated and then joined.

2. Background Art

Titanium alloys have long been used to fabricate engine valves for racing and other high performance engines. More recently, titanium aluminides, titanium borides and other titanium intermetallic compounds (TICs) have been used to make engine valves. Titanium is particularly well suited to such applications because of its high strength-to-weight ratio. However, the relatively high cost of titanium has been a deterrent to its use for valves in higher volume passenger car applications where steel remains the valve material of choice. Nevertheless, the performance advantages that can be realized with titanium valves recommend them as an increasingly attractive alternative for passenger car engines.

Aside from the higher material cost of titanium relative to steel, a significant reason for the higher cost of titanium valves is the processing required with traditional fabrication techniques. Titanium alloys used to make engine valves require heat treatments that cause the stem of the valve blank to distort or warp. Although this same problem arises when steel engine valves are heat treated, the distortion of steel valves can be fairly easily removed by mechanical straightening at room or elevated temperature. In the case of titanium alloy valves, the high ratio of titanium's strength to elastic modulus makes this solution impractical. The technique typically utilized with titanium valves is to restrain them from distorting during thermal processing. Such restraint is conventionally provided by suspending the valve on a latticework rack with the stem extending downwardly. Loading such racks is generally done manually and is very time consuming. Moreover, the racks themselves are expensive and tend to warp after several uses due to the elevated temperatures to which they are exposed. Once the racks warp, they no longer provide the intended support, and therefore they must be continually monitored, repaired and/or replaced.

The brittle nature of TICs at room temperature make mechanical straightening impossible. Furthermore, racking as with titanium alloy valves is not a practical solution since the TIC valve blanks will only straighten by vertical racking at very high temperature, and the warpage can occur in the casting or blanking operation. The currently employed solution is to use oversize blanks with the excess material being machined or ground to the desired envelope.

The brittle nature and low strength of TICs at and near room temperature hamper their utility in engines for another reason as well. The various valve actuating mechanisms that are currently employed to open and close valves can apply major bending loads at or near the locating groove emplaced near the top of each valve stem. The primary value of the TICs is to provide strength in the combustion chamber region of the valve (i.e., in the valve head area) where it is hot. Thus, a valve consisting of a strong ductile conventional titanium alloy metal in the upper portion of the stem combined with a TIC in the lower portion of the stem and the valve head would optimize the structural integrity at the valve.

It is known to fabricate steel engine valves in two parts. For example, U.S. Pat. No. 4,073,474 discloses an upset-forged valve in which at least the head and neck portions of the valve are made of a super alloy, and the remaining stem portion of the valve is made of a conventional valve steel. The two portions of the valve are joined by friction welding prior to the forging process. Composite titanium valves have also been proposed. In this regard, U.S. Pat. No. 4,729,546 suggests that the head and stem of a titanium valve may be fabricated separately as distinct preforms which are then inertially welded together. U.S. Pat. No. 4,852,531 discloses a titanium valve having head and stem powder preforms that are joined by cold compaction and then vacuum sintered. In both of the last two mentioned patents, the head and stem portions of the valve are joined within or adjacent to the fillet region. When the resulting valve is installed in an engine, at least a part of the stem portion is exposed below the valve guide and, in the case of an exhaust valve, is exposed to the exhaust gasses.

SUMMARY OF THE INVENTION

The present invention provides a titanium engine valve fabricated with discrete head and stem portions, preferably joined by inertia welding and/or diffusion bonding. The joint between the head and stem portions is located well up on the valve stem so that it is not exposed below the valve guide. A conventional high strength titanium alloy is utilized for the head portion, which is forged and heat treated using conventional processes. Alternatively, the head portion may consist of a cast or forged heat treated TIC. However, the stem portion, which is not directly exposed to the hostile environment of the combustion chamber, may be fabricated with mill annealed conventional titanium alloy rod stock. The resulting valve is, therefore, much less expensive to manufacture than a conventional titanium valve without sacrificing any mechanical characteristics in the portions of the valve subjected to high stress and temperature.

DETAILED DESCRIPTION Of THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known materials and processes are omitted so as to not obscure the description of the present invention with unnecessary detail.

Figure 1:
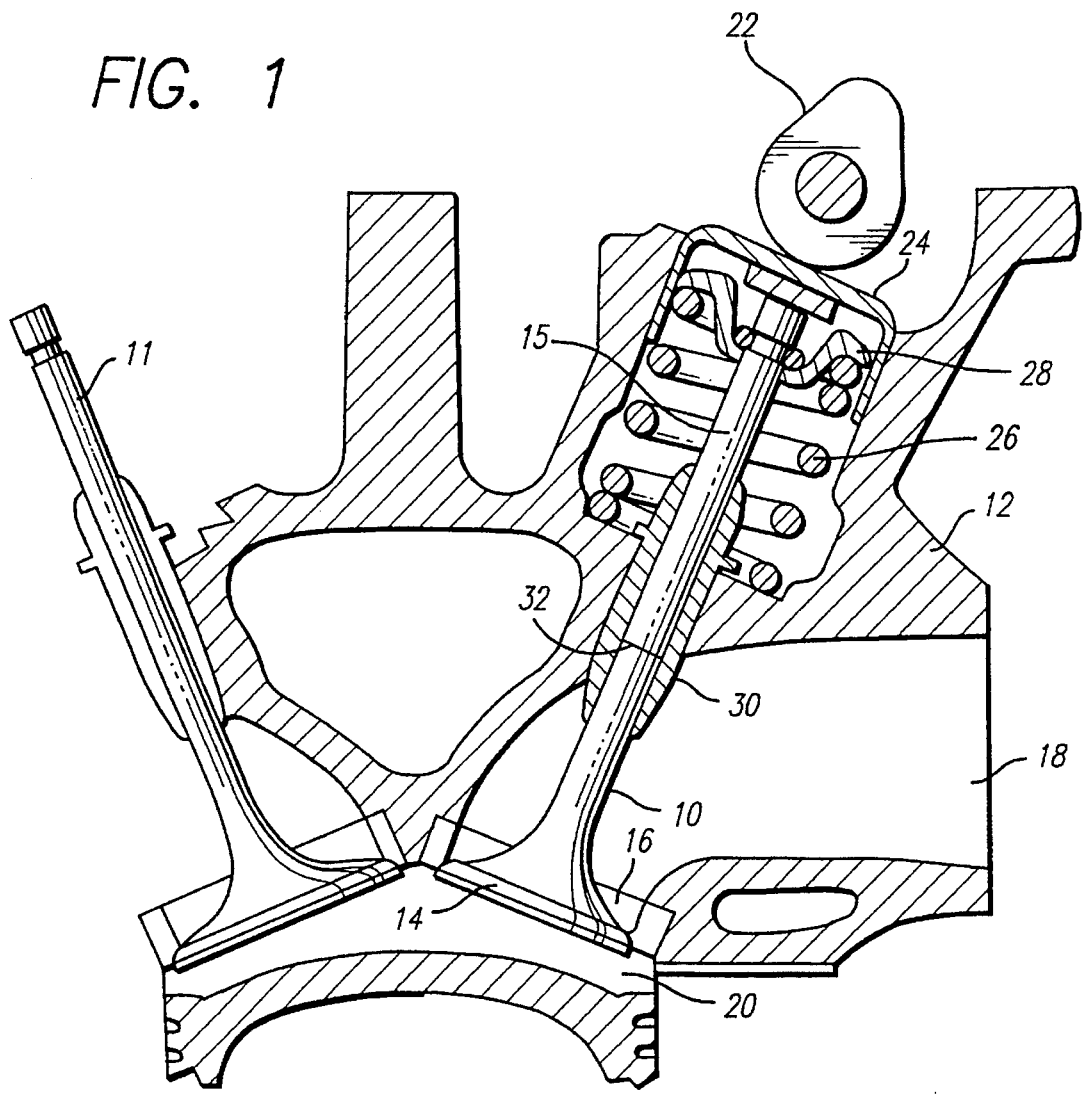
FIG. 1 is a partial cross sectional view of an internal combustion engine utilizing the valve of the present invention.

FIG. 1 illustrates a typical modern high performance internal combustion engine. An exhaust valve 10 and an intake valve 11 are disposed within cylinder head 12. Only a single intake and a single exhaust valve are shown, although it will be understood that many modern high performance engines now have four or even five valves per cylinder. Further description will be confined to the exhaust valve, although it will be understood that much of the following description applies to the intake valve as well. Head portion 14 of the exhaust valve mates with valve seat 16 to seal exhaust port 18 from combustion chamber 20. Valve 10 is actuated by cam 22 acting against tappet 24. Valve 10 is biased to the closed position by a spring 26. Spring 26 is compressed between cylinder head 12 and valve spring retainer 28. Other valve actuating mechanisms may be employed, such as air springs or direct lever actuation. Valve 10 reciprocates within valve guide 30 which includes a seal against the valve stem 15 to prevent escape of exhaust gasses and also to prevent entry of lubricating oil into the combustion chamber.

Figure 2:
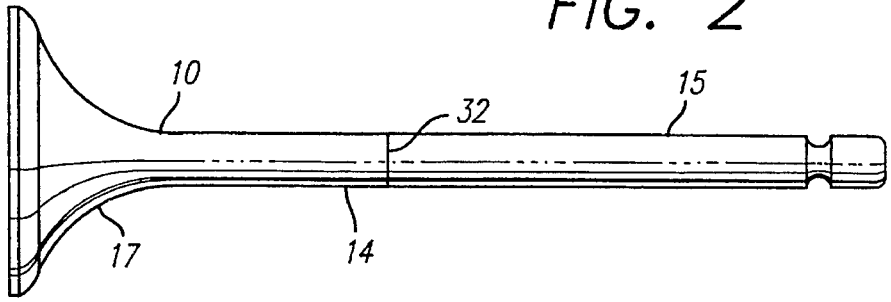
FIG. 2 is a side view showing an example of a titanium valve constructed in accordance with the present invention.

With reference now also to FIG. 2, the head portion 14 and stem portion 15 of valve 10 are joined at interface 32 above the fillet region 17. It will be observed in FIG. 1 that interface 32 remains within valve guide 30 throughout the stroke of valve 10. Thus, only the head portion 14 of valve 10 is exposed to the exhaust gasses when the valve is open during the exhaust stroke of the engine. Typically, and particularly for passenger car applications, only this portion of the valve requires the improved material strength developed by heat treatment of the valve material. Stem portion 15, which remains within or above valve guide 30, requires only the mechanical properties of mill annealed titanium alloy. Accordingly, stem portion 15 may be conveniently fabricated from mill annealed rod stock without further heat treatment.

Head portion 14 of valve 10 including fillet region 17 and the portion of the stem extending up to interface 32 is sufficiently short so that it can be heat treated or subjected to hot isostatic pressing (HIP'ing) without being racked as is necessary for heat treatment of complete titanium valves. The short stem length of head portion 14 maintains its original shape during the heat treating process so that only final machining is required to correct any warping.

Head portion 14 may comprise any conventional high strength, high temperature titanium alloy, preferably having an aluminum content of 8% or less by weight. Suitable alloys include 6-4 (Ti-6Al-4V), 6242s (Ti-6Al-2Sn-4Zr-2Mo-0.1Si), and 6246 (Ti-6Al-2Sn-4Zr-6Mo). The head portion may also be fabricated with titanium intermetallic compounds. Head portion 14 is preferably forged and then heat treated and/or HIP'ed, followed by any necessary premachining operation. Heat treating for exhaust valves is typically done at just above the beta-transus temperature, thereby producing a relatively coarse colony microstructure. Intake valves are typically heat treated below the beta-transus temperature to preserve a relatively fine grained microstructure.

Stem portion 15 may comprise a relatively less expensive titanium alloy, including 6-4 or commercially pure (CP). The stem portion may be formed by either rolling, drawing or casting. If desired, the stem is heat treated and/or HIP'ed separate from the head portion of the valve. Stem portion 15 may be either processed in a straight rod condition or premachined and/or ground until straight. Following their respective premachining operations, head portion 14 and stem portion 15 are joined by diffusion bonding, inertial welding or friction welding, all of which involve relatively low temperatures (well below the beta-transus) and insure axial and radial alignment of the resulting valve. Final machining to the specified tolerances is then performed.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A titanium valve for an internal combustion engine having a valve guide and a valve actuating mechanism for reciprocating the valve within the valve guide, said titanium valve made by the process of:

(a) forming a head portion composed of a first material comprising titanium, said head portion including a fillet region and a lower stem region;

(b) heat treating said head portion;

(c) forming a stem portion composed of a second material comprising titanium without further heat treatment subsequent to said forming;

(d) joining said stem portion to said lower stem region of the head portion at a location such that the stem portion does not extend below the valve guide as said titanium valve is reciprocated by the valve actuating mechanism.

2. The valve of claim 1 wherein the head portion and stem portion are joined by diffusion bonding.

3. The valve of claim 1 wherein the head portion and stem portion are joined by inertial welding.

4. The valve of claim 1 wherein the head portion and stem portion are joined by friction welding.

5. The valve of claim 1 wherein the first material is a titanium intermetallic compound.

6. The valve of claim 1 wherein the head portion is heat treated at a temperature above the beta-transus temperature of the first material comprising titanium.

7. A method of fabricating a titanium valve for an internal combustion engine having a valve guide and a valve actuating mechanism for reciprocating the valve within the valve guide, said method comprising the steps of:

(a) forming a head portion composed of a first material comprising titanium, said head portion including a fillet region and a lower stem region;

(b) heat treating said head portion:

(c) forming a stem portion composed of a second material comprising titanium without further heat treatment subsequent to said forming;

(d) joining said stem portion to said lower stem region of the head portion at a location such that the stem portion does not extend below the valve guide as said titanium valve is reciprocated by the valve actuating mechanism.

8. The method of claim 7 wherein the head portion and stem portion are joined by diffusion bonding.

9. The method of claim 7 wherein the head portion and stem portion are joined by inertial welding.

10. The method of claim 7 wherein the head portion and stem portion are joined by friction welding.

11. The method of claim 7 wherein the first and second materials are titanium alloys.

12. The method of claim 7 wherein the first material is a titanium intermetallic compound.

13. The method of claim 12 wherein the second material is a titanium intermetallic compound.

14. The method of claim 7 wherein the stem portion is formed from mill annealed rod.

15. The method of claim 7 further comprising the step, after step (a), of heat treating the head portion at a temperature above the beta-transus temperature of the first material comprising titanium.

* * * * *